United States Patent [19]

Sundet

[11] Patent Number: 4,595,708
[45] Date of Patent: Jun. 17, 1986

[54] REVERSE OSMOSIS MEMBRANE, CASTING SOLUTION, AND PROCESSES FOR MAKING SAME

[75] Inventor: Sherman A. Sundet, Wilmington, Del.

[73] Assignee: E. I. Du Pont de Nemours and Company, Wilmington, Del.

[21] Appl. No.: 597,383

[22] Filed: Apr. 6, 1984

[51] Int. Cl.$^4$ .............................. C08J 9/28; C08J 9/26; C08K 3/16; C08L 77/10
[52] U.S. Cl. ..................................... 521/63; 524/233; 524/234; 524/436; 524/606
[58] Field of Search ............... 524/727, 436, 233, 234, 524/606; 521/63

[56] References Cited

U.S. PATENT DOCUMENTS 4,529,763  7/1985  Tamura ............................... 524/234

FOREIGN PATENT DOCUMENTS 54-133537  10/1979  Japan .................................. 524/727

Primary Examiner—C. Warren Ivy

[57] ABSTRACT

A casting solution of polyaramide in N,N-dimethylacetamide containing about 10 to 60% by wt. $MgCl_2$, based on polyaramide, and a process for making such casting solution, are provided. An asymmetric permselective membrane and process for making such membrane from the casting solution are also provided. Such membrane has excellent performance characteristics in a reverse osmosis process for purifying salt water.

20 Claims, No Drawings

REVERSE OSMOSIS MEMBRANE, CASTING SOLUTION, AND PROCESSES FOR MAKING SAME

BACKGROUND OF THE INVENTION

Asymmetric membranes for use in a variety of purification operations have long been known. Permeation selective or permselective membranes preferentially pass certain components of liquid mixtures while acting as a barrier for other components. In reverse osmosis membranes, a hydrostatic pressure in excess of the equilibrium osmotic pressure of the liquid mixture or solution is applied to the liquid to force the more permeable components, usually water, through the membrane in preference to the less permeable components, such as a salt, contrary to the normal osmotic flow.

In the preparation of membranes for these applications, a film or hollow fiber is first cast from a casting dope. After partial removal of the casting solvent, this film is then extracted by treating with a nonsolvent to replace the balance of the original casting solvent. A wide variety of additives has been suggested for the modification of the physical and performance characteristics of the resulting membrane. For example, various salts such as lithium chloride and lithium nitrate have been used to increase the permeability of the resulting membrane. However, while these have functioned satisfactorily in the modification of the final product, the salts typically have the undesirable characteristic of decreasing the salt rejection of the resulting membrane. In addition, some lithium salts have resulted in decreased thermal stability of casting solutions containing them.

Such asymmetric membranes of aromatic polyamides (polyaramides) are known, e.g., from U.S. Pat. No. 3,567,632.

It is an object of this invention to provide improved asymmetric membranes of aromatic polyamides, improved casting dopes of such polymer, and processes for making same.

It is a more specific object of this invention to provide a casting dope in N,N-dimethylacetamide which contains a substantial amount of magnesium chloride.

It is a further object of this invention to provide a casting solution from which membranes of consistently high salt rejection can be made.

SUMMARY OF THE INVENTION

Briefly, according to the present invention, there is provided an improved casting dope of a polyaramide, an improved reverse osmosis polyaramide membrane having high salt rejection, high flux and improved flux retention characteristics, and processes for making the casting dope and membrane.

Specifically, there is provided in a membrane casting solution comprising a film- and fiber-forming sulfonated polyaramide, solvent and at least one metal salt, the improvement wherein the solvent is at least about 60% by wt. N,N-dimethylacetamide, the metal salt is $MgCl_2$, and the amount of magnesium ion, expressed as $MgCl_2$, is about 10 to about 60% by wt., based on said polyaramide, and is about 3% to about 9% by wt., based on the total weight of the casting solution, and the water:magnesium ion molar ratio is in the range of 2.2:1 to 1:1.

There is also provided a reverse osmosis sulfonated polyaramide membrane, the sulfonate content of said polyaramide being 0.7 to 1.5 meq $SO_3^-$/g of polymer, which membrane, after annealing in water at 75° C. for 1 hour, (a) has a salt rejection of at least 0.95, (b) has a water flux constant at one hour of at least $2m.s^{-1}.TPa^{-1}$ and (c) retains, after use for reverse osmosis with brine containing 2000 parts per million of sodium chloride for 150 hours at 23° C. at 2.9 MPa, at least 80% of its water flux constant at one hour.

Further aspects of the invention include processes for making the casting solution and the membrane, and are described in detail below.

DETAILED DESCRIPTION OF THE INVENTION

The sulfonated polyaramides used in the present membrane casting solutions include those which have previously been used in the art for the preparation of permselective and reverse osmosis membranes. These can include, for example, those sulfonated polyaramides disclosed among others by Richter et al, U.S. Pat. No. 3,567,632, which is hereby incorporated by reference.

The sulfonated polyaramide preferably has a sulfonate content of 0.7 to 1.5 milliequivalents (meq) of $SO_3^-$ (sulfonate groups) per gram of polymer. More preferably, the sulfonate content is 0.8 to 1.1 meq $SO_3^-$/g polymer. It is also preferred that the sulfonate groups of the sulfonated polyaramide be attached to carbon atoms of aromatic rings of the diamine moieties of the polymer, i.e., that the polyaramide be derived from unsulfonated diacyl reactant, unsulfonated diamine and sulfonated diamine.

Suitable polyaramides include those derived from one or more sulfonated aromatic diamines or one or more sulfonated aromatic diacyl chlorides. Those based on sulfonated aromatic diamines such as 2,4-diaminobenzenesulfonic acid or 4,4'-diaminodiphenyl ether-2,2'-disulfonic acid are preferred.

Polyamides obtained by reaction of an aromatic diacyl halide with hydrazine, or by reaction of an aromatic diamine with oxalyl chloride are also suitable, so long as the aromatic component includes, in part, sulfonated reactant.

The solvent used for the casting solutions of this invention should comprise at least about 60% by wt. of N,N-dimethylacetamide (DMAc). Other solvents can be used in conjunction with N,N-dimethylacetamide which are compatible with the principal solvent. For example, N-methylpyrrolidone and dimethyl sulfoxide can be used in quantities of up to about 40% of the total solvent without negating the benefits of the present invention. Preferably, however, N,N-dimethylacetamide comprises at least about 90% of the solvent used, and particularly desirable results are obtained when the solvent used is substantially pure N,N-dimethylacetamide. The term "substantially pure N,N-dimethylacetamide" as employed herein is intended to include such solvent which contains small amounts of water which may be present in it when used in the polymerization reaction, described below, or which may subsequently be formed in the reaction of hydrogen chloride formed in the polymerization with magnesium oxide, hydroxide or carbonate, also described below. As noted below, the solvent used for the polymerization reaction is ordinarily substantially dry, so as to preclude hydrolysis of the diacyl halide by water. The amount of water which can be tolerated in the casting solution is limited to that which does not result in precipitation of an insoluble magnesium chloride, most often the hexahydrate, inasmuch as membranes prepared from casting solutions which are turbid or which contain insoluble particles have unacceptably low and/or inconsistent salt rejections. The amount of water which can be tolerated is in some cases on the order of 2%, but is often well above 2%, and varies with parameters such as the specific polymer composition, especially the amount of sulfonate groups in the polymer, and also the amount of amide groups in the polymer, the polymer molecular weight, and the concentration of polymer in the solution. Amounts of water up to that which causes precipitation of an insoluble magnesium chloride are suitable.

A principal feature of the membrane casting solutions of the present invention is that it contains magnesium chloride as a porosity control agent. Use of this salt results in flat membranes and hollow fibers which exhibit higher flux and improved salt rejection over membranes prepared from solutions having the salt additives previously used in the art.

The overall composition of the present casting solutions can vary, depending on the particular polymer used and the casting operation for which the solution is intended. However, in general, the casting solution comprises about 10 to about 35% by wt. of polyaramide, based on the total weight of the casting solution, although solutions containing less than 10% or more than 35% polyaramide can also be made. The casting solution further comprises about 10 to about 60% by wt., preferably 30 to 50% by wt., based on the weight of the polyaramide, of magnesium ion ($Mg^{+2}$), expressed as $MgCl_2$.

The amount of $Mg^{+2}$, expressed as $MgCl_2$, based on the total weight of the casting solution, should be about 3% to about 9% by wt., to insure adequate water flux rates of membrane prepared from the solution. It is preferred that the amount of $MgCl_2$, based on the total weight of the casting solution, be 4-8% by wt., and most preferably 5-8% by wt., in order to obtain the best membrane performance properties.

The amount of $Mg^{+2}$ in a casting solution can be found in either of two ways. First, it can be calculated from the known quantities of all substances used to prepare the casting solution. Or secondly, it can be done by carrying out a chemical analysis; for this purpose a sample of a casting solution is subjected to a digestion procedure acording to R. Bock, *A Handbook of Decomposition Methods and Analytical Chemistry*, translated and revised by I. L. Marr, J. Wiley, New York, NY, 1979, pp 215-218, or according to G. H. Morrison, editor, *Trace Analysis, Physical Methods*, Interscience, New York, N.Y., 1965, pp 245-269, and the residue from such digestion is subjected to a method of analyzing for metals suitable for magnesium, specifically as set forth in ASTM Standards, 1977 Annual Book, Part 31, method D-511 (page 265), D-2576 (page 403) or D-3561 (page 380). In either case, the $Mg^{+2}$ content of the casting solution is expressed as $MgCl_2$; the result is expressed in this manner because, although in many cases a small amount of the $Mg^{+2}$ in the solution may be associated with $—SO_3^-$ groups on the polyaramide, it would be a difficult task to devise an analytical procedure that would differentiate between $Mg^{+2}$ associated with $Cl^-$ and that with $SO_3^-$, and in any case, it is believed that the result so expressed does not differ significantly from the actual $MgCl_2$ content of the solution.

In some cases, as will be more fully described below with reference to preparation of the casting solution, the casting solution further comprises a 2-chloroalkanol, which is derived from reaction of hydrogen chloride formed in the polymerization reaction with an epoxide. A typical such component is 1,3-dichloropropanol-2, derived by reaction of epichlorohydrin with hydrogen chloride.

The casting solution of the invention can be made by a process comprising (a) reacting at least one aromatic diamine with at least one aromatic diacyl chloride, said at least one aromatic diamine and said at least one aromatic diacyl chloride being used in substantially equimolar amounts, in the solvent defined herein, to form a solution of said polyaramide and hydrogen chloride in the solvent, and (b) adding to the product of step (a) magnesium oxide, hydroxide, or carbonate, or a mixture thereof in an amount from about 0.15 to 0.5 mol per mol of hydrogen chloride formed in step (a).

Formation of a polyaramide by reaction of aromatic diamine with aromatic diacyl chloride in a suitable reaction medium is a process now well known in the art, illustrative of which is U.S. Pat. No. 3,567,632.

In the process of the present invention for making a casting solution, the casting solution is made directly from the polymerization mixture so obtained, without isolation of the polymer therefrom. It is, accordingly, an advantage of this invention that the instant process avoids the steps of isolation of polymer from a preparation step, and dissolution of it in a solvent medium.

In accordance with the invention, the magnesium chloride componet of the casting solution is made in situ by reaction of hydrogen chloride with magnesium oxide, magnesium hydroxide, magnesium carbonate, or a mixture thereof. Other basic compounds of magnesium that react with HCl can also be used. Hydrogen chloride is present in the polymerization reaction mixture as a by-product of the polyamidation reaction of amine groups with acyl chloride groups. Depending on the amount of $MgCl_2$ desired in the casting solution, typically about 30 to 100% of the hydrogen chloride formed in the polyamidation reaction is reacted with said magnesium compound, i.e., about 0.15 and 0.5 mol of said magnesium compound is used per mol of hydrogen chloride formed in the polyamidation reaction.

Ordinarily, all of the hydrogen chloride present is reacted with MgO or $Mg(OH)_2$ or $MgCO_3$ to form $MgCl_2$. When the polyaramide prepared is derived in part from a sulfonated aromatic diamine, it is possible to add to the composition additional amounts of magnesium oxide, hydroxide, or carbonate to react with the sulfonic acid groups on the sulfonated amine, the amount of said magnesium compound being up to 0.5 mol per equivalent of sulfonate group present, so as to place the sulfonate groups in whole or in part in the form of a magnesium salt thereof.

If the amount of magnesium chloride desired in a casting solution is less than the amount which would be formed by reaction of all the hydrogen chloride present with said magnesium compound, although it is not necessary to remove or otherwise destroy the portion of HCl not reacted with said magnesium compound, it is nevertheless desirable to do so in view of the highly corrosive nature of HCl. This can be done, e.g., as noted above, by reacting HCl with an epoxide, such as epichlorohydrin. The epoxide can be used in an amount up to about 0.5 mol per mol of HCl present, and can be added either before or after said magnesium compound is added to the composition.

Although the N,N-dimethylacetamide (and other solvent component which may be used) employed in the polymerization step ordinarily will contain very little water, typically less than 100 ppm water by drying it over molecular seives, after reaction of hydrogen chloride in the polymerization reaction mixture with magnesium oxide, hydroxide or carbonate, there will be some water present in the casting solution. In the casting solutions of the invention, the ratio of mols of water to mols of magnesium ion, i.e., $H_2O:Mg^{+2}$, is in the range of 1:1 to about 2.2:1, and preferably is in the range of 1:1 to about 2:1. Values of the $H_2O:Mg^{+2}$ ratio in excess of 2:1 are attained when additional water is introduced with a reactant, such as the basic magneisum compound used to react with HCl, or with the diamine, or with solvent used, e.g., to adjust the viscosity of the casting solution by adding to the solution DMAc or other solvent which contains water. However, the $H_2O:Mg^{+2}$ ratio should not be as high as 3:1 because the poorly soluble $MgCl_2.6H_2O$ will begin to form and precipitate.

Casting solutions used for making reverse osmosis membranes should be particle free, i.e., clear, so as to provide membranes which are free of defects and which exhibit good salt rejection. The casting solutions provided by the present invention are optically clear and bright as prepared, but, as a precaution, have nevertheless been filtered, e.g., with a filter having 5-micron pores, before casting membrane therefrom; in almost all instances, nothing observable has been collected on the filter. All values reported herein as to compositions of casting solutions are in reference to the filtered compositions.

Casting solutions as described herein can contain amounts of magnesium chloride which are in excess of those which can be obtained by prolonged mixing of magnesium choride and DMAc, and which may be in excess of the solubility limit of magnesium chloride in DMAc, i.e., the solutions may be supersaturated with respect to magnesium chloride when compared to the system $MgCl_2$/DMAc. By direct solution, only limited amounts of magnesium chloride, in either "dry" or hydrated forms, can be dissolved in N,N-dimethylacetamide (DMAc) in a reasonable period of time, as is shown in the following table, which data were obtained by stirring an excess of the indicated salt in the solvent at 23° C. for an extended time, followed by filtering and determination of the quantity dissolved.

| Salt | $MgCl_2.0.28H_2O$ | $MgCl_2.3.1H_2O$ | $MgCl_2.6H_2O$ |
|---|---|---|---|
| % by wt $H_2O$ in salt | 5 | 37 | 53 |
| g of salt dissolved in 100 g DMAc | 2.16 | 7.75 | 3.30 |
| g of anhydrous $MgCl_2$ in 100 g DMAc | 2.05 | 4.89 | 1.55 |

As is seen, neither the "anhydrous" salt nor the hexahydrate, each of which is commercially available, is readily soluble or dissolvable in DMAc, and often contains other insoluble materials. Although the trihydrate is somewhat more soluble, the solution so obtained can tolerate but little additional water before the hexahydrate crystallizes from the solution. In any case, during the work on the present invention, it was noted that far more magnesium chloride generated in situ could be maintained in solution in DMAc containing dissolved polyaramide than could be achieved by attempting to dissolve magnesium chloride anhydrous, trihydrate or hexahydrate into a similar solution. Clean, filterable casting solutions according to the invention can contain as much as 7 or 8 g of anhydrous $MgCl_2$ per 100 g of N,N-dimethylacetamide solvent also containing dissolved polyaramide. Such solutions, which possibly may be metastable, have proven stable to storage for periods of a year or more.

By virtue of the present invention, casting solutions of superior quality which contain both a high concentration of polyaramide in N,N-dimethylacetamide (DMAc) and a high ratio of $MgCl_2$ to polyaramide have now been prepared for the first time. Attempts to prepare such casting solution of acceptable quality by directly dissolving magnesium chloride, in either "anhydrous" or a hydrated form, in DMAc or in a solution of polyaramide in DMAc, have failed, in that they have led only to casting solutions of poorer quality as evidenced by the poor salt rejection values of membrane prepared therefrom.

The membrane casting solutions of the present invention can be used to prepare either flat or hollow fiber membranes according to conventional casting techniques. The resulting membranes exhibit higher flux and improved salt rejection characteristics over previous membranes, and, in addition, show higher salt rejections at high flux levels than membranes prepared from casting solutions of the prior art.

Specifically, membrane is suitably prepared by a process comprising
 (a) casting a layer of said membrane casting solution on a support;
 (b) removing a portion of said solvent from said layer by vaporization;
 (c) immersing the product of step (b) in water at 0° C. to 30 ° C. for 2 minutes to 20 hours; and
 (d) annealing the product of step (c) by heating in water at a temperature in the range of 50 to 100° C. for at least 30 seconds.

The vaporization of solvent in step (b) can be carried out suitably at 80°–120° C. for at least 30 sec. Preferably, the water employed in step (c) is at a temperature between 5° and 15° C. Moreover, in step (d), the annealing time is preferably at least 5 minutes, and can be as long as 4 hours.

Such a process provides a reverse osmosis polyaramide membrane having outstanding performance characteristics. It is a reverse osmosis polyaramide membrane which, after annealing in water at 75° C. for 1 hour, (a) has a water flux constant at one hour of at least $2m.s^{-1}.TPa^{-1}$, and (b) retains, after use for reverse osmosis with brine containing 2000 parts per million of sodium chloride for 150 hours at 23° C. at 2.9 MPa, at least 80% of its water flux constant at one hour. (Results of tests carried out for 150 hours at temperatures of 22°–25° C. do not significantly differ from like tests at 23° C.) Such membrane also has excellent salt rejection (R), generally at least 0.95, most often at least 0.96, and frequently as high as 0.98 or 0.99. Preferably, the water flux constant at one hour is at least $3m.s^{-1}.TPa^{-1}$.

In the case of polymers having at least 0.8 meq $SO_3^-$/g polymer, and especially in the case of those having at least 0.9 meq $SO_3^-$/g polymer, it has been found that when the concentration of Mg$^{+2}$ in the casting solution is at least 0.3 molal, preferably at least 0.4 molal, the water permeation rate is disproportionately higher than what is expected by extrapolation from water permeating rates at lower Mg$^{+2}$ molality.

Another significant advantage of the casting solutions of the present invention, which contain high levels of magnesium chloride, is that the drying conditions for making membranes of high salt rejection and high water flux are less critical than for casting solutions of the prior art.

Another advantage of the invention is the use of N,N-dimethylacetamide (DMAc) as the principal or sole component of the solvent for the casting solution. Since DMAc is far more inert with respect to competing side reactions with acyl chlorides than is N,N-dimethylformamide (DMF), and therefore does not adversely limit the molecular weight of polyaramides formed from such acyl chlorides and diamines, it can advantageously be used as the solvent for both the polyamidation reaction and the casting of membranes. This represents an economic advantage for this invention by precluding the necessity for two solvent recovery steps in the preparation of membranes.

Numerous other advantages of the present invention are apparent from the above description.

The innovative aspects of the present invention are further illustrated in the following examples, in which parts and percentages are by weight unless otherwise indicated.

The m-phenylene diamine-4-sulfonic acid used in Examples 1–3 and 5–8 and Comparative Example A was 93% by wt. pure and contained about 7% by wt. inorganic sulfate. The weights of this material specified in those examples are the weights of the 93% pure material, and thus must be multiplied by 0.93 to obtain the actual amounts of that diamine used in those examples.

EXAMPLES

Example 1

39.5 parts by weight of m-phenylene diamine and 25.4 parts by weight of m-phenylene diamine-4-sulfonic acid were dissolved in 422 parts by wt. of dimethylacetamide and the solution stirred during the addition of a molten mixture of 71.05 parts by wt. of isophthaloyl chloride and 30.45 parts by wt. of terephthaloyl chloride. The temperature was maintained at 45°–50° C. by heating or cooling as necessary, and another 187 parts by wt. of dimethylacetamide was added during the reaction to keep the system stirrable. After the addition was complete, the system was stirred for 60 minutes more to complete the reaction.

This solution, containing the hydrogen chloride formed in the condensation, was then reacted with 22.9 parts by wt. of magnesium oxide, which reacted and dissolved to give a clear polymer solution. This amount of MgO was enough to neutralize the hydrogen chloride and the sulfonic acid present. An additional 47 parts by wt. of dimethylacetamide was added to adjust the solution viscosity.

This solution was filtered through a 5-micron filter (as was the case in all of the Examples given herein) and was then used directly to cast membranes for permeability measurements. Membranes were made by casting the solution on a glass plate at 95° C. with a Gardner knife set at 380 microns (15 mils). After the drying times indicated, the membranes were quenched in water at 8° C., extracted in water overnight, and annealed in water at 65° C. for 4 hours. The membranes obtained exhibited the following performance, when tested at 23° C. at 5.52 MPa (800 psi), with brine containing 3.g NaCl per liter:

| Drying Time | Salt Rejection R | Flux Constant Kw(m · s$^{-1}$ · TPa$^{-1}$) |
|---|---|---|
| 3 min. | 0.974, 0.975 | 3.56, 3.72 |
| 5 min. | 0.988, 0.991 | 2.66, 2.66 |

The casting solution was stable to extended storage. A portion which was stored for six months at room temperature remained clear. Additional membranes were prepared substantially as described above, and tested as above except that the brine contained 3.4 g NaCl per liter. Their performance was as follows:

| Drying Time | Salt Rejection R | Flux Constant Kw(m · s$^{-1}$ · TPa$^{-1}$) |
|---|---|---|
| 3 min. | 0.964, 0.980 | 4.66, 4.80 |
| 5 min. | 0.985, 0.991 | 3.05, 2.95 |

Example 2

The polymerization was carried out as in the first paragraph of Example 1. The solution was neutralized with 20.2 parts by wt. of magnesium oxide, only enough to neutralize the hydrogen chloride formed in the polycondensation. This solution was clear and stable in storage, and was used directly to prepare membranes for permeability testing. These exhibited, after annealing in water for 4 hrs at 65° C., the following properties when tested at 23° C. at 5.52 MPa, with brine containing 3.3 g NaCl per liter:

| Drying Time | Salt Rejection R | Flux Constant Kw(m · s$^{-1}$ · TPa$^{-1}$) |
|---|---|---|
| 2½ min. | 0.973, 0.986 | 3.65, 3.99 |
| 4 min. | 0.986, 0.991 | 2.99, 3.23 |

Example 3

The polycondensation was carried out as in the first paragraph of Example 1. The solution was neutralized with 16.1 parts by wt. of magnesium oxide, only 80% of that theoretically necessary to neutralize the hydrogen chloride formed in the condensation. The resulting solution was clear and stable in storage, and was used directly to prepare membranes for permeability testing. These exhibited, after annealing in water for 4 hrs at 65° C., the following properties when tested at 23° C. at 5.52 MPa, with brine containing 3.3 g NaCl per liter:

| Drying Time | Salt Rejection R | Flux Constant Kw(m · s$^{-1}$ · TPa$^{-1}$) |
|---|---|---|
| 2½ min. | 0.953, 0.970 | 4.09, 4.09 |
| 4 min. | 0.979, 0.992 | 3.57, 3.23 |

Example 4

47 parts by weight of m-phenylenediamine and 23.4 parts by wt. of 4,4'-diaminodiphenylether-2,2'-disulfonic acid were dissolved in 422 parts by wt. of dimethylacetamide and the solution stirred during the addition of a molten mixture of 71.05 parts by wt. of isophthaloyl chloride and 30.45 parts by wt. of terephthaloyl chloride. The temperature of the reaction mixture was maintained at 45°–50° C. and another 234 parts by wt. of dimethylacetamide was added to keep the system stirrable.

After reaction was complete, 22.5 parts by wt. of magnesium oxide was added to neutralize the hydrogen chloride formed in the reaction and the sulfonic acid groups or the polymer. Another 140 parts by wt. of dimethylacetamide was needed to adjust the viscosity.

The resulting solution was clear and stable to storage. It was used directly to prepare membranes for testing. After being annealed in water for 4 hours at 65° C., these gave the following properties when tested at 23° C. at 5.52 MPa, with brine containing 3.5 g NaCl per liter:

| Drying Time | Salt Rejection R | Flux Constant Kw(m · s$^{-1}$ · TPa$^{-1}$) |
|---|---|---|
| 4 mins. | 0.963, 0.943 | 2.85, 3.91 |
| 7 mins. | 0.963, 0.979 | 2.05, 2.10 |

Example 5

The polymerization was carried out as in the first paragraph of Example 1, except that a total of 740 parts by wt. of DMAc was used. Thirty-five percent of the hydrogen chloride formed in the condensation was reacted with 32.4 parts by weight of epichlorohydrin, then 14.1 parts by wt. of magnesium oxide was added to react with the remainder of the hydrogen chloride and some of the sulfonic acid groups.

The resulting polymer solution, which was lower in MgCl$_2$ content than Example 1, was clear and stable to storage. It was used directly for the preparation of membranes for permeability testing. After annealing in water at 65° C. for four hours, the membranes exhibited properties as shown in the following table, when tested at 23° C. at 5.52 MPa with brine containing 3.4 g NaCl per liter:

| Drying Time | Salt Rejection R | Flux Constant Kw(m · s$^{-1}$ · TPa$^{-1}$) |
|---|---|---|
| 3 mins. | 0.930, 0.947 | 4.10, 4.20 |
| 5 mins. | 0.989, 0.987 | 2.40, 2.62 |
| 7 mins. | 0.977, 0.991 | 2.30, 2.33 |

Example 6

43.3 g of m-phenylene diamine and 19.9 g of m-phenylene diamine-4-sulfonic acid were dissolved in 400 ml of dimethylacetamide and the solution stirred during the addition of a molten mixture of 71.05 g of isophthaloyl chloride and 30.45 g of terephthaloyl chloride. The temperature was maintained at ca. 55° C. by heating or cooling as necessary, and another 320 ml of dimethylacetamide was added during the reaction to keep the system stirrable. After the addition was complete, the system was stirred for 60 minutes more to complete the reaction.

This solution, containing the hydrogen chloride formed in the condensation, was then reacted with 29.0 g of magnesium hydroxide, which reacted and dissolved to give a clear polymer solution. This amount of Mg(OH)$_2$ was enough to neutralize the hydrogen chloride present. An additional 50 ml of dimethylacetamide was added to adjust the solution viscosity.

This solution was used directly to cast membranes for permeability measurements. The membranes obtained from this solution, after being dried for 3 min at 95° C., quenched in water at 8° C., thoroughly extracted with water, and annealed in water for 2 hours at 65° C., exhibited the following performance when tested at 23° C. with brine containing 3.5 g NaCl per liter:

| Drying Time (min) | Test Pressure (MPa) | Salt Rejection R | Flux Constant Kw(m · s$^{-1}$ · TPa$^{-1}$) |
|---|---|---|---|
| 2 | 3.45 | 0.955, 0.986 | 2.84, 3.13 |
| 2 | 5.52 | 0.966, 0.986 | 2.91, 3.18 |
| 3 | 3.45 | 0.981, 0.979 | 1.79, 1.89 |
| 3 | 5.52 | 0.984, 0.986 | 1.93, 1.75 |

Comparative Example A

The procedure of the first paragraph of Example 6 was repeated.

This solution, containing the hydrogen chloride formed in the condensation, was then reacted with 28.0 g of calcium oxide, which reacted and dissolved to give a clear polymer solution. This amount of CaO was enough to neutralize the hydrogen chloride present. An additional 50 ml of N,N-dimethylacetamide was added to adjust the solution viscosity.

Membranes were prepared and tested as described in the third paragraph of Example 6, and exhibited the following performance:

| Test Pressure (MPa) | Salt Rejection R | Flux Constant Kw(m · s$^{-1}$ · TPa$^{-1}$) |
|---|---|---|
| 3.45 | 0.698, 0.698 | 3.38, 3.38 |
| 5.52 | 0.698, 0.698 | 3.82, 4.00 |

Note that the salt rejections obtained in Ex. 6, where a magnesium compound was used to neutralize the hydrogen chloride, are far superior to those obtained in Comparative Ex. A, where calcium oxide was used to neutralize the hydrogen chloride.

Example 7

Example 6 was repeated in its entirety, except that, in place of the 29.0 g of magnesium hydroxide, 42.0 g of magnesium carbonate was used. The membranes obtained exhibited the following performance, when tested at 23° C. with brine containing 3.7 g NaCl per liter:

| Drying Time (min) | Test Pressure (MPa) | Salt Rejection R | Flux Constant Kw(m · s$^{-1}$ · TPa$^{-1}$) |
|---|---|---|---|
| 1.5 | 3.45 | 0.952 | 4.65 |
|  | 5.52 | 0.956 | 4.49 |
| 2 | 3.45 | 0.930 | 1.83 |
|  | 5.52 | 0.959 | 1.92 |
| 3 | 3.45 | 0.973, 0.978 | 1.61, 1.51 |
|  | 5.52 | 0.985, 0.986 | 1.70, 1.54 |

In Table I, the compositional characteristics of the casting solutions of all of the above examples are tabulated.

TABLE I

| Example | Polyaramide Based on Total Casting Solution (% by wt.) | $Mg^{+2}$ Expressed as $MgCl_2$, Based on Polymer (% by wt.) | $Mg^{+2}$ Expressed as $MgCl_2$, Based on Total Casting Solution (% by wt.) | Ratio of Mols of Water to Mols of $Mg^{+2}$ | Water Based on Total Casting Solution (% by wt.) | Sulfonate Content (meq of $SO_3$ per g of polymer) |
|---|---|---|---|---|---|---|
| 1 | 15.4 | 36.7 | 5.63 | 1.14 | 1.21 | 0.97 |
| 2 | 15.4 | 36.6 | 5.65 | 1.00 | 1.07 | 0.97 |
| 3 | 15.5 | 29.3 | 4.54 | 1.00 | 0.86 | 0.97 |
| 4 | 13.8 | 34.7 | 4.81 | 1.12 | 1.02 | 0.95 |
| 5 | 14.6 | 25.7 | 3.50 | 1.00 | 0.66 | 0.97 |
| 6 | 14.0 | 37.1 | 5.20 | 2.00 | 1.97 | 0.77 |
| A | 14.0 | 43.3* | 6.07* | 1.00** | 0.98 | 0.76 |
| 7 | 13.8 | 37.1 | 5.13 | 1.00 | 0.97 | 0.77 |

*% by wt. $Ca^{+2}$, expressed as $CaCl_2$.
**ratio of mols of water to mols of $Ca^{+2}$.

Comparative Examples B, C, D and E

Four casting solutions were prepared from the components listed in Table II.

TABLE II

| Example | DMAc (g) | Polyaramide (g) | $MgCl_2.0.28H_2O$ (g) | $H_2O$ (g) |
|---|---|---|---|---|
| B | 41.0 | 7.5 | 1.5 | — |
| C | 40.5 | 7.5 | 1.5 | 0.47 |
| D | 38.75 | 7.5 | 3.75 | — |
| E | 37.6 | 7.5 | 3.75 | 1.16 |

The polyaramide had the same composition as that described in Example 6 (0.77 meq $SO_3^-$/g polymer), and was prepared substantially as described in that example, except that calcium oxide was used to neutralize the HCl formed in the polyamidation reaction, following which the polymer was precipiated from the reaction mixture with water and thoroughly washed to remove $CaCl_2$ formed. The $MgCl_2.0.28H_2O$ was the commercial grade of so-called anhydrous $MgCl_2$.

To prepare the casting solutions, the magnesium chloride, and the water if any was used, were first added to the DMAc and stirred. The polyaramide was then added and stirring was continued. All four resulting solutions were cloudy, and D had some solid particles in it. Each solution was then filtered through a millipore filter having 5-micron pores; solution D blinded the filter. These solutions had compositional characteristics set forth in Table III.

TABLE III

| Example | Polyaramide Based on Total Casting Solution (% by wt.) | $Mg^{+2}$ Expressed as $MgCl_2$, Based on Polymer (% by wt.) | $Mg^{+2}$ Expressed as $MgCl_2$, Based on Total Casting Solution (% by wt.) | Ratio of Mols of Water to Mols of $Mg^{+2}$ | Water Based on Total Casting Solution (% by wt.) |
|---|---|---|---|---|---|
| B | 15 | 19 | 2.85 | 0.28 | 0.15 |
| C | 15 | 19 | 2.85 | 2.02 | 1.09 |
| D | 15 | 47.5 | 7.13 | 0.28 | 0.375 |
| E | 15 | 47.5 | 7.13 | 2.00 | 2.7 |

Membranes were prepared by casting these solutions substantially as described in Example 1, except that the Gardner knife was set at 330 microns (13 mils), and the membrane was dried for 3 minutes before quenching, and finally annealed in water at 65° C. for 2 hours. Additional membranes were also prepared in the same way from the casting solutions of Examples 6 and 7 and Comparative Example A. The membranes so made, when tested at 23° C. at 5.52 MPa with brine containing 3.5 g NaCl per liter, had salt rejections as follows, when measured on duplicate specimens cut from the same membrane:

| Example | Salt Rejection |
|---|---|
| 6 | 0.984, 0.986 |
| 7 | 0.985, 0.986 |
| A | 0.698, 0.698 |
| B | 0.916, 0.942 |
| C | 0.938, 0.810 |
| D | 0.874, 0.968 |
| E | 0.915, 0.853 |

Several conclusions are drawn from this group of examples.

First, the salt rejections for Examples 6 and 7 are far superior to those of Example A, which demonstrates the superiority of solutions containing $MgCl_2$ over those containing $CaCl_2$, even when both are prepared by neutralizing the HCl formed in the polyamidation with a basic compound of the metal.

Second, the salt rejections of Examples 6 and 7 are superior to those of Examples B, C, D and E, which demonstrates the superiority of solutions containing $MgCl_2$ formed in situ (i.e., formed by reacting the HCl formed in the polyamidation reaction with a basic compound of Mg) over those wherein magnesium chloride or a mixture of magnesium chloride and water is dissolved in the solvent.

Third, the salt rejections for duplicate samples of the membranes of Examples 6 and 7 are highly consistent, while those of Examples B, C, D and E are erratic. It is, of course, highly advantageous to be able to obtain consistent, reproducible results, rather than erratic results. It is believed that the consistent performance of Examples 6 and 7 is a result of the manner in which the $MgCl_2$ was generated in situ, and that the erratic performance of Examples B, C, D and E is a result of inhomogeneity on a microscopic scale of the casting solutions, and membranes obtained therefrom, prepared by dissolving preformed magnesium chloride, in spite of filtering such casting solutions through a fine-pore filter.

Example 8

A solution of 25.3 parts by weight of m-phenylene diamine and 17.8 parts by weight of m-phenylene diamine-4-sulfonic acid in 390 parts by wt. of N,N- dimethyl acetamide (DMAc) was reacted in a continuous polymerizer with a 70/30 mixture of isophthaloyl and terephthaloyl chlorides, whose feed was adjusted to obtain near maximum polymer viscosity. The resulting polymer contained 1.03 meq $SO_3^-$/g of polymer. Then MgO was added to adjust the apparent pH to 5.5 (glass-calomel electrode) and DMAc added to reduce its viscosity to 40 Pa.s (400 poise). In this solution, the amount of $MgCl_2$ (anhydrous) based on polymer was 36.5% by wt., and the ratio of mols of water to mols of $MgCl_2$ (anhydrous) was 1.14.

Membranes were prepared from this solution by casting on a glass plate with a knife setting of 13 mils, partial drying before quenching in 8° C. water, extracting in water for 72 hours, and then annealing in water for 2 hrs. at 65° C.

When tested at 2.90 MPa (420 psi) and 23° C. with NaCl solution containing 2.7 g/1 (2700 ppm) the membranes gave performance as follows:

| Drying Time (min) | Salt Rejection R | Flux Constant $Kw(m \cdot s^{-1} \cdot TPa^{-1})$ | |
|---|---|---|---|
| | | After 1 hr | After 150 hrs |
| 3 | 0.86 | 6.75 | 5.80 |
| 4 | 0.89 | 5.60 | 4.98 |
| 5½ | 0.96 | 4.36 | 4.20 |

INDUSTRIAL APPLICABILITY

The membranes of the invention are generally useful in a variety of permeation selective processes. They are especially suited for use in reverse osmosis processes for recovery of potable water from salt water, sea water, and brackish water.

I claim:

1. In a membrane casting solution comprising about 10 to about 35%, by weight of a film forming polyaramide containing sulfonate substituents on the aromatic rings present in an amount of from about 7 to 11.5 milliequivalents of $SO_3^-$ per gram of polymer, solvent and at least one metal salt, the improvement wherein the solvent is at least about 60% by wt. N,N-dimethylacetamide, the metal salt comprises $MgCl_2$ which has been formed in situ by reaction of HCl with a basic magnesium compound, and the amount of magnesium ion, expressed as $MgCl_2$, is about 10 to about 60% by wt., based on said polyaramide, and is about 3% to about 9% by wt., based on the total weight of the casting solution, and the water:magnesium ion molar ratio is in the range of 2.2:1 to 1:1.

2. A casting solution of claim 1 wherein the sulfonate content of said polyaramide is 0.8 to 1.1 meq $SO_3^-$/g of polymer.

3. A casting solution of claim 1 or 2 wherein the sulfonate groups of said sulfonated polyaramide are attached to carbon atoms of aromatic rings of the diamine moieties of the polymer.

4. A casting solution of claim 3 wherein said solvent is at least about 90% by wt. N,N-dimethylacetamide.

5. A casting solution of claim 4 which further comprises a 2-chloroalkanol.

6. A casting solution of claim 5 wherein said 2-chloroalkanol is 1,3-dichloropropanol 2.

7. A casting solution of claim 4 wherein said solvent is substantially pure N,N-dimethylacetamide.

8. A casting solution of claim 4 which comprises from about 10 to about 35% by wt. polyaramide, based on the total weight of said casting solution.

9. A casting solution of claim 8 wherein the amount of magnesium ion, expressed as $MgCl_2$, is 30 to 50% by wt., based on said polyaramide, and is about 4–8% by wt., based on the total weight of the casting solution.

10. A casting solution of claim 9 wherein said polyaramide consists essentially of units corresponding to those derived from metaphenylene diamine, a sulfonated aromatic diamine, isophthalic acid and terephthalic acid.

11. A casting solution of claim 10 wherein at least some of the sulfonate groups of said polyaramide are in the form of the magnesium salt thereof.

12. A casting solution of claim 10 wherein said s aromatic diamine is 2,4-diaminobenzenesulfonic acid.

13. A casting solution of claim 12 wherein at least some of the sulfonate groups of said polyaramide are in the form of the magnesium salt thereof.

14. A casting solution of claim 10 wherein said sulfonated aromatic diamine is 4,4'-diaminodiphenyl ether-2,2'-disulfonic acid.

15. A casting solution of claim 14 wherein at least some of the sulfonate groups of said polyaramide are in the form of the magnesium salt thereof.

16. A process for making a casting solution of claim 1 or 2, said process comprising
(a) reacting at least one aromatic diamine with at least one aromatic diacyl chloride, said at least one aromatic diamine and said at least one aromatic diacyl chloride being used in substantially equimolar amounts, there being at least one sulfonated aromatic diamine or diacyl chloride, in a solvent, to form a solution of said polyaramide and hydrogen chloride in said solvent, and
(b) adding to the product of step (a) magnesium oxide, hydroxide, carbonate, or a mixture thereof in an amount from about 0.15 to 0.5 mol per mol of hydrogen chloride formed in step (a).

17. A process of claim 16 wherein said at least one aromatic diamine includes at least one unsulfonated aromatic diamine and at least one sulfonated aromatic diamine.

18. A process of claim 17 which further comprises
(c) adding to the product of step (a) or (b) magnesium oxide, hydroxide, carbonate, or a mixture thereof in an amount up to 0.5 mol per equivalent of sulfonate group present on the polyaramide moieties derived from said at least one sulfonated aromatic diamine.

19. A process of claim 16 wherein, following step (a) or (b), an epoxide is added in an amount of up to about 0.5 mol per mol of said hydrogen chloride, and, in step (b), the amount of said magnesium oxide, hydroxide, carbonate, or mixture thereof is less than 0.5 mol per mol of said hydrogen chloride.

20. A process of claim 19 wherein said epoxide epichlorohydrin.

* * * * *

UNITED STATES PATENT OFFICE
CERTIFICATE OF CORRECTION

PATENT NO. : 4,595,708

DATED : June 17, 1986

INVENTOR(S) : Sherman Archie Sundet

It is certified that error appears in the above-identified patent and that said Letters Patent are hereby corrected as shown below:

In column 13, line 41, change "7 to 11.5" to read -- 0.7 to 1.5 --.

Signed and Sealed this

Sixth Day of September, 1988

Attest:

DONALD J. QUIGG

Attesting Officer

Commissioner of Patents and Trademarks